(12) United States Patent
Nagayama et al.

(10) Patent No.: US 7,462,964 B2
(45) Date of Patent: Dec. 9, 2008

(54) FULLY-ENCLOSED FAN-COOLED MOTOR

(75) Inventors: Takashi Nagayama, Kanagawa-ken (JP); Minoru Kitamura, Tokyo (JP); Shigetomo Shiraishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 446 days.

(21) Appl. No.: 11/386,834

(22) Filed: Mar. 23, 2006

(65) Prior Publication Data

US 2006/0226717 A1    Oct. 12, 2006

(30) Foreign Application Priority Data

Mar. 23, 2005    (JP)    ............................. 2005-084239

(51) Int. Cl.
*H02K 9/00*     (2006.01)
*H02K 9/06*     (2006.01)

(52) U.S. Cl. .................. 310/58; 310/59; 310/60 A; 310/61; 310/62

(58) Field of Classification Search .................. 310/58, 310/59–62
See application file for complete search history.

(56) References Cited

U.S. PATENT DOCUMENTS 4,275,321 A * 6/1981 Shimamoto et al. ............ 310/59
4,554,472 A * 11/1985 Kumatani ..................... 310/62
6,774,514 B2 * 8/2004 Matsuoka et al. ............. 310/58
6,891,290 B2   5/2005 Nagayama et al.
2001/0017498 A1 * 8/2001 Matsuoka et al. ............. 310/90

FOREIGN PATENT DOCUMENTS

JP        2004166464 A  *  6/2004
JP        2004187352 A  *  7/2004

* cited by examiner

*Primary Examiner*—Tran Nguyen
(74) *Attorney, Agent, or Firm*—Finnegan, Henderson, Farabow, Garrett & Dunner, L.L.P.

(57) ABSTRACT

A first minute gap (18) is formed between the front end of a ventilation fan (16) and a first bracket (8) and a second minute gap (21) is formed between the front end of a partition member (19) and a second bracket (11); a first aperture (9a) is provided in a location at the inner periphery further inward than the vanes (16b) on the bearing bracket (9); a current of cooling air is formed by introduction of external air by the ventilation fan from this aperture; this current of cooling air is again discharged to the outside through a ventilation passage (8a) of the first bracket and a ventilation passage (1a) on the outer peripheral side of the stator core (1); in addition, a second aperture (11b) is provided in the second bracket (11), a current of cooling air is formed by introduction of external air by the ventilation fan from the second aperture (11b); and this current of cooling air is again discharged to the outside through the ventilation passage (3a) of the rotor core (3), the ventilation passage of the first bracket and the ventilation passage on the outer peripheral side of the stator core.

17 Claims, 11 Drawing Sheets

(SIDE OPPOSITE TO THE DRIVE SIDE) ← FLOW OF CURRENT OF COOLING AIR (DRIVE SIDE)

FULLY-ENCLOSED FAN-COOLED MOTOR

CROSS-REFERENCE TO RELATED APPLICATION

This application claims benefit of priority from Japanese application No. JP 2005-84239 filed Mar. 23, 2005, the entire content of which is incorporated by reference herein.

BACKGROUND OF THE INVENTION

1. Field of the Invention

The present invention relates to a fully-enclosed fan-cooled motor for driving a rail vehicle (sometimes also called fully-enclosed motor with outer fans).

2. Description of the Related Art

In a typical rail vehicle (hereinbelow referred to as a "vehicle"), a main motor (or a traction motor) (hereinbelow called the "motor") is mounted on a chassis arranged below the vehicle body, and the turning effort of this motor is transmitted to the vehicle wheels through a coupling and gear-wheel device to move the vehicle. The construction of a conventional motor of this type is for example as shown in FIG. 1.

In this Figure, the arrows indicate the direction of flow of cooling air.

In the conventional motor shown in FIG. 1, there is provided a cylindrical frame 101 constituting a fixed member; a bearing bracket 102 is mounted at one end of this frame 101; a housing 103 is mounted in the central section of the other end of the frame 101; both ends of a rotor shaft 106 are freely rotatably supported by bearings 104, 105 provided respectively in the center of this bearing bracket 102 and housing 103.

A rotor core 107 is fixed in the central section in the axial direction of the rotor shaft 106; rotor bars 108 are embedded in a large number of grooves formed at the periphery of this rotor core 107; the two ends of the respective rotor bars 108 project from the rotor core 107, and these projecting sections are integrally connected by ring-shaped end rings 109, 109 to form a cage rotor of the induction motor. The rotor core 107 is provided with a plurality of ventilation passages 107a passing therethrough in the axial direction and is fixed by means of core holders 110, 110 having similar passages 110a.

A cylindrical stator core 111 is mounted on the inner periphery of the frame 101; stator coils 112 are accommodated in a large number of grooves formed at the inner periphery of this stator core 111. The coil ends of these stator coils 112 are of a form projecting on both sides of the stator core 111.

A uniform gap 113 is formed between the inner peripheral surface of this stator core 111 and the outer peripheral surface of the rotor core 107. The drive shaft 106a of the rotor shaft 106 projects outside the motor and a coupling for coupling with a drive gearwheel device is mounted on this projecting section of the drive shaft 106a. Also, a ventilation fan 114 is mounted on a section of the rotor shaft 106 within the motor. This ventilation fan 114 has a plurality of vanes 114a arranged radially from its center.

A plurality of exhaust ports 101a are provided along the peripheral direction in a section of this frame 101 facing the front end of this ventilation fan 114. An air intake port (sometimes also called air inlet port) 101b is provided above the side opposite to the drive side of the frame 101 and a ventilation filter 115 is mounted so as to cover this air intake port 101b; a filter 115a for capturing dust is mounted at the external air inlet of this ventilation filter 115.

The entire motor shown in FIG. 1 has a mounting arm (not shown) provided on the frame 101 that is fixed by means of bolts to the chassis frame; the rotary force of the motor is transmitted from the drive device to the vehicle wheels through a coupling connected with the drive shaft 106a of the rotor shaft 106, thereby driving the vehicle.

When this motor is operated, heat is generated by the stator coils 112 and the rotor bars 108, so cooling is performed by passing external air through the interior of the motor. Rise in temperature of the motor is suppressed by this cooling. This cooling action is as follows.

During operation, the ventilation fan 114 is rotated together with the rotor shaft 106, causing the air within the motor to be discharged to outside the motor from the exhaust ports 101a; accompanying this, external air is sucked into the motor from the intake (sometimes also called inlet) 101b. The external air that is sucked into the motor flows into the motor from the inlet 101b through the ventilation filter 115 and then flows to the ventilation fan 114 through the ventilation passages 107a of the rotor core 107, and the gap 113 between the outer periphery of the rotor core 107 and the inner periphery of the stator core 111, and is then discharged to outside the motor from the exhaust ports 101a by rotation of the ventilation fan 114.

In this way, the rotor bars 108 and stator coils 112 are cooled by passage of external air through the motor. It is thereby possible to ensure that the rise in temperature of the rotor bars 108, stator coils 112, bearings 104, 105 and the grease that is used to lubricate these does not exceed the permitted temperature.

However, the external air that is drawn in represents a severely polluted environment in that large quantities of dust are present entrained in the external air around a motor that is mounted on the underfloor chassis of an electric car or the like during vehicle running. Consequently, in a motor according to the conventional example illustrated in FIG. 1, there was the technical problem that, although an attempt was made to clean the external air that was drawn into the motor by capturing the dust by the filter 115a of the ventilation filter 115, with continuous operation, gradual blockage of the filter 115a took place, decreasing the amount of ventilation within the motor; periodic cleaning/maintenance of the filter was therefore required at short intervals, requiring the expenditure of a very considerable amount of labor.

In order to solve this problem, in recent years, efforts are being made to further develop fully-enclosed fan-cooled motors. An example of the construction of such a fully-enclosed fan-cooled motor is shown in FIG. 2 and the description will be given referring to this example. The arrows indicate the direction of flow of the cooling air, just as in the case of the previous Figure.

A bracket 202 is provided at the drive side end of the frame 201, which is of the form of a cylinder provided with a bottom, and a housing 203 is provided in the middle on the opposite side to the drive side. A stator core 204 is provided at the inner periphery of the frame 201.

A rotor shaft 207 is freely rotatably supported by means of bearings 205, 206 respectively mounted on the bracket 202 and housing 203; a rotor core 208 is provided in the middle in the axial direction of this rotor shaft 207. The drive side end 207a of the rotor shaft 207 projects outside the motor and a coupling with a ventilation fan 209 is mounted on this projecting section. A large number of cooling passages 201a of a shape extending in the axial direction are provided at the outer circumferential face of the frame 201. A ventilation passage 202a is provided in the bracket 202, the drive side thereof opening towards the tip of the ventilation fan 209. Also, the side opposite to the drive side is open to the external atmosphere. An air inlet 209a of the ventilation fan 209 on the drive side of the motor forms an external air inlet.

This fully-enclosed fan-cooled motor is provided with a minute gap 210 formed in hook shape so as not to permit penetration of external air to the region of the bearings and is thus of a fully-enclosed form in which the interior of the motor is cut off from the outside.

Thus, during operation, by passing external air, by rotation of the ventilation fan 209, in the axial direction along the ventilation passage 201a at the outer periphery of the frame 201 via the ventilation passage 202a of the bracket 202, the heat from the rotor bars 211 or stator coils 212 transmitted through the stator core 204 and frame 201 from the wall face in the ventilation passages 201a is discharged to the external atmosphere.

In this fully-enclosed fan-cooled motor, since external air is not made to flow through the interior of the motor, there is the advantage that there is no possibility of contamination of the interior of the motor by dust mixed with this external air and, furthermore that, since it is the portion outside the motor that is cooled by the external air, a filter to remove the dust from this external air is unnecessary.

However, in such a typical fully-enclosed fan-cooled motor, although the heat generated by the stator coils 212 can be discharged to the external atmosphere from the ventilation passages 201a by being transmitted through the core 208 and frame 201, there were the following problems, which presented a considerable obstacle to implementing an ideal fully-enclosed fan-cooled motor.

Firstly, the heat generated by the rotor bars 211 was shut in within the motor, and represented a source of so-called local heat generated solely by the rotor.

Secondly, the heat generated by the stator coils 212 and the heat generated by the rotor bars 211 raised the temperature of the bearings 205, 206, constituting a cause of temperature increase of the grease used to lubricate the bearings 205, 206, which is the item, of the various items in the motor, which has the lowest permitted temperature. If the bearing grease is raised to a high temperature, its lubrication life becomes short and, as a result, the maintenance recursiveness (maintenance recurrence or maintenance period) of the motor cannot be extended.

Thus, as a countermeasure, there was no alternative to designing a conventional fully-enclosed fan-cooled motor in such a way as to suppress generation of heat by the rotor, to ensure that the permitted temperature of the bearing grease was secured: the result was to present obstacles to design of a motor having a larger rotor than normal and offering high output with small size and light weight.

SUMMARY OF THE INVENTION

An object of the present invention is therefore to provide a fully-enclosed fan-cooled motor wherein the heat-generating bodies such as the stator coils or rotor bars can be effectively cooled and, as a result, wherein rise in temperature of the bearing grease can be suppressed.

In order to achieve the above object, a fully-enclosed fan-cooled motor according to a first aspect of the present invention is constructed as follows. Specifically, a fully-enclosed fan-cooled motor comprises:

a stator core; a rotor core arranged at the inner periphery of this stator core, provided with a ventilation passage passing therethrough in the axial direction; a first bearing provided by means of a first bracket having a ventilation passage and a bearing bracket at one end of said stator core; a second bearing provided by means of a second bracket and housing at the other end of this stator core; a rotor shaft on which the rotor core is mounted, freely rotatably supported by the first and second bearings; a ventilation passage linked with the ventilation passage of the first bracket, formed at the outer periphery of the stator core; a ventilation fan with vanes arranged on the outer surface thereof, mounted in a location on the rotor shaft between the first bearing and the rotor core; and a partition member mounted on the rotor shaft between the second bearing and said rotor core;

and is constituted such that a (first) minute gap is formed that blocks inflow of air into the motor between the front end of the ventilation fan and the first bracket and a (second) minute gap is formed that blocks inflow of air into the motor between the front end of the partition member and the second bracket; an aperture is provided in a location at the inner periphery further inward than the vanes on the bearing bracket; a current of cooling air is formed by introduction of external air by the ventilation fan from this aperture; this current of cooling air is again discharged to the outside through the ventilation passage of the first bracket and the ventilation passage on the outer peripheral side of the stator core; in addition, an aperture is provided in the second bracket, a current of cooling air is formed by introduction of external air by the ventilation fan from this aperture; and this current of cooling air is again discharged to the outside through the ventilation passage of said rotor core, the ventilation passage of the first bracket and the ventilation passage on the outer peripheral side of the stator core.

Also, according to a second aspect of the present invention, a fully-enclosed fan-cooled motor comprises:

a stator core; a rotor core arranged at the inner periphery of this stator core, provided with a ventilation passage passing therethrough in the axial direction; a first bearing provided by means of a first bracket having a ventilation passage and a bearing bracket at one end of said stator core; a second bearing provided by means of a second bracket and housing at the other end of this stator core; a rotor shaft on which the rotor core is mounted, freely rotatably supported by the first and second bearings; a ventilation passage linked with the ventilation passage of the first bracket, formed at the outer periphery of the stator core; a ventilation fan with vanes arranged on the outer surface thereof, mounted in a location on the rotor shaft between the first bearing and the rotor core; and a partition member mounted on the rotor shaft between the second bearing and said rotor core;

and is characterized in that it is constituted such that a minute gap is formed that blocks inflow of air into the motor between the front end of the ventilation fan and the first bracket and a minute gap is formed that blocks inflow of air into the motor between the front end of the partition member and the second bracket; an aperture is provided in the second bracket, a current of cooling air is formed by introduction of external air by the ventilation fan from this aperture; and this current of cooling air is again discharged to the outside through the ventilation passage of the rotor core, the ventilation passage of the first bracket and the ventilation passage on the outer peripheral side of the stator core.

Also, according to a third aspect of the present invention, a fully-enclosed fan-cooled motor comprises: a stator core; a rotor core arranged at the inner periphery of this stator core, provided with a ventilation passage passing therethrough in the axial direction; a first bearing provided by means of a first bracket having a ventilation passage and a bearing bracket at one end of said stator core; a second bearing provided by means of a second bracket and housing at the other end of this stator core; a rotor shaft on which the rotor core is mounted, freely rotatably supported by the first and second bearings; a ventilation passage linked with the ventilation passage of the first bracket, formed at the outer periphery of the stator core; a ventilation fan with vanes arranged on the inner and outer surfaces thereof, mounted in a location on the rotor shaft further towards the outside of the motor than the first bearing; a ventilation fan dedicated to the rotor core that sucks out the air in the rotor core ventilation passage on the side of the first bearing, mounted at a location on the rotor shaft between the rotor core and the first bearing; and a partition member mounted on the rotor shaft between the second bearing and the rotor core;

and is characterized in that it is constituted such that a minute gap is formed that blocks inflow of air into the motor between the front end of the ventilation fan dedicated to the rotor core and the bearing bracket or first bracket and a minute gap is formed that blocks inflow of air into the motor between the front end of the partition member and the second bracket; an aperture is provided in a location at the inner periphery on the bearing bracket further inward than the vanes on the internal face of the ventilation fan; a current of cooling air is formed by introduction of external air by the ventilation fan; this current of cooling air is again discharged to the outside through the ventilation passage of said first bracket and the ventilation passage on the outer peripheral side of the stator core; in addition, an aperture is provided in the second bracket, a current of cooling air is formed by introduction of external air by the ventilation fan dedicated to the rotor core and by said ventilation fan from this aperture; and this current of cooling air is again discharged to the outside through the ventilation passage of said rotor core, the aperture of the bearing bracket, the ventilation passage of the first bracket and the ventilation passage on the outer peripheral side of the stator core.

With a fully-enclosed fan-cooled motor according to the present invention, heat-generating bodies such as the stator coils or rotor bars can be effectively cooled and, as a result, the rise in temperature of the bearing grease can be suppressed and the bearing lubrication life consequently greatly extended. Also there is no contamination of the interior of the motor, so an ideal motor can be provided in which labor-saving in regard to maintenance can be achieved.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
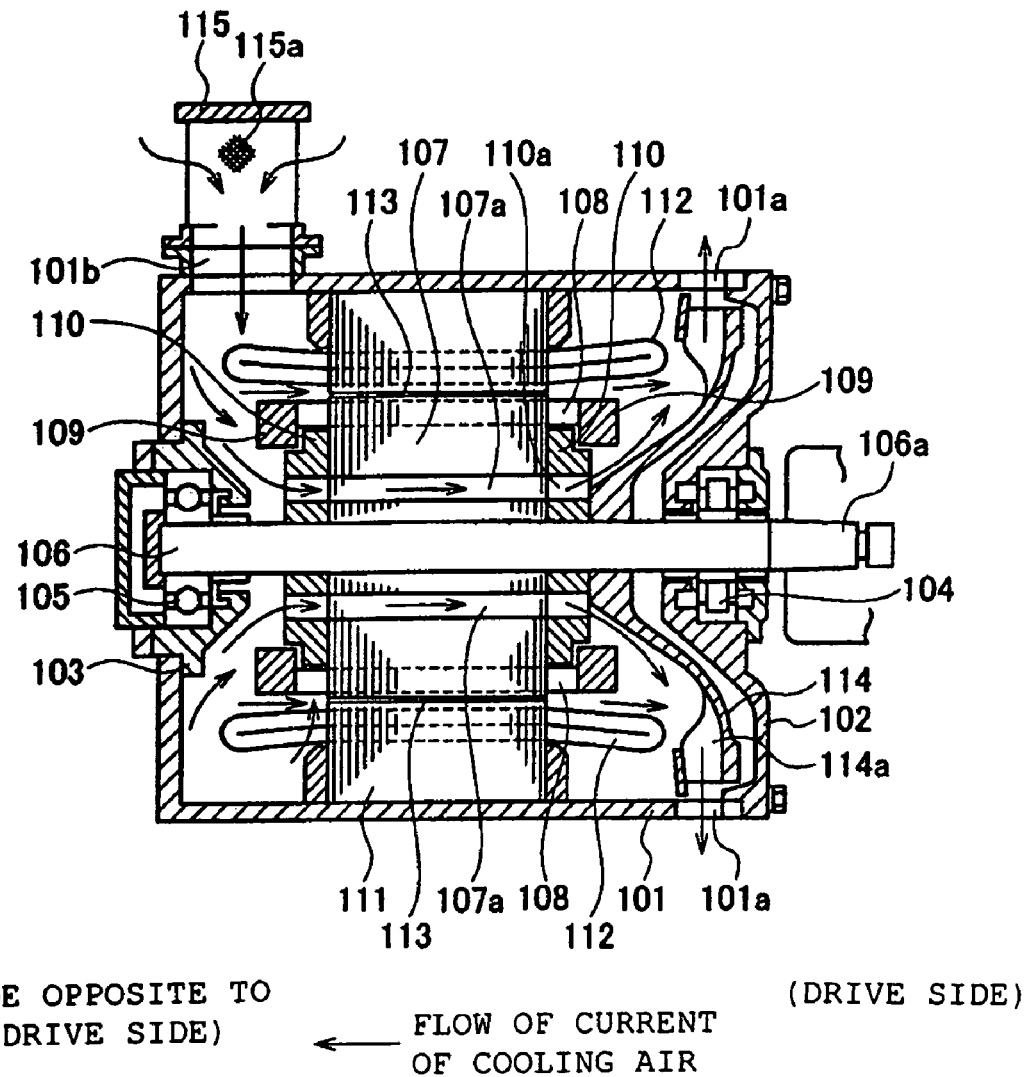
FIG. 1 is a cross-sectional view in the axial direction of a conventional motor for vehicle drive.
Figure 2:
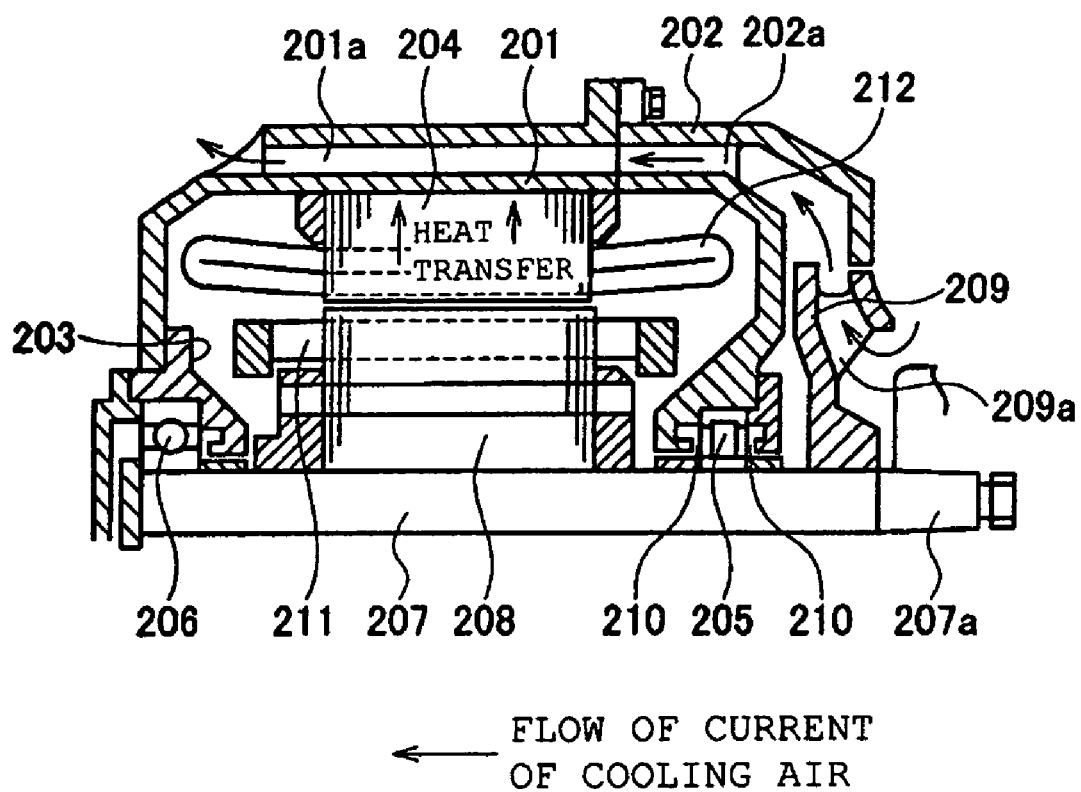
FIG. 2 is a cross-sectional view in the axial direction of a conventional motor for vehicle drive.

Referring now to the drawings, wherein like reference numerals designate identical or corresponding parts throughout the several views, and more particularly to FIG. 3 thereof, one embodiment of the present invention will be described.

Figure 3:
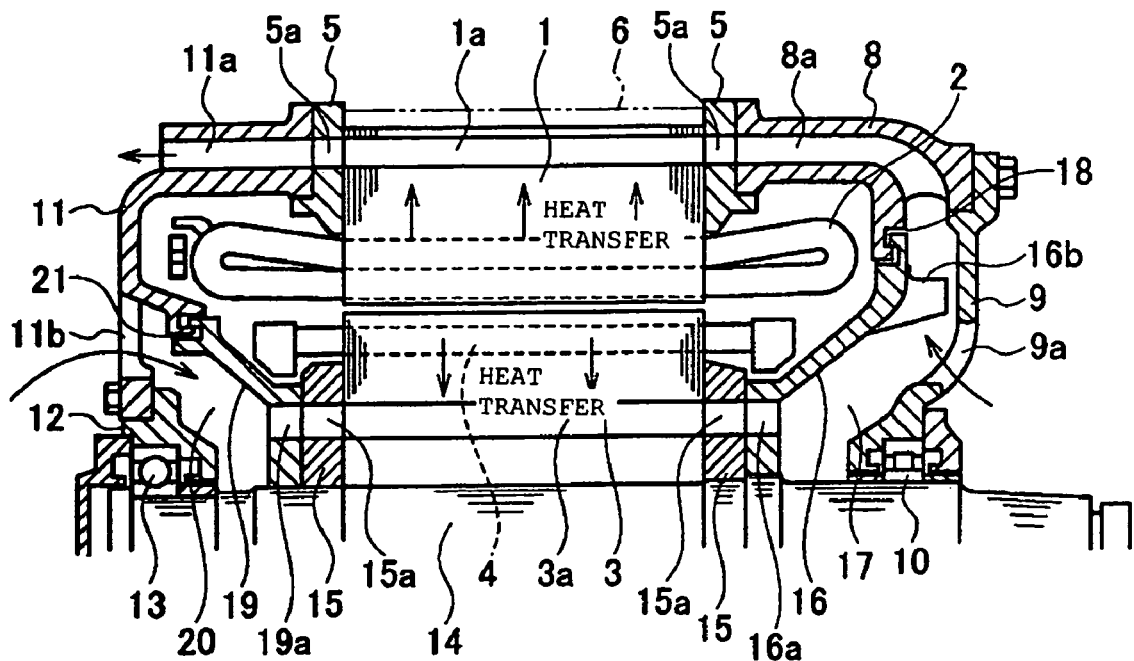
FIG. 3 is a cross-sectional view in the axial direction of a first embodiment of the present invention.

FIG. 3 is a cross-sectional view in the axial direction of a first embodiment of the present invention.

As shown in FIG. 3, this fully-enclosed fan-cooled motor comprises a stator core 1 of cylindrical shape. A large number of grooves are provided in the inner periphery of the stator core 1 and stator coils 2 are accommodated in these grooves. The coil ends of these stator coils 2 project at both sides of the state of core 1.

A cylindrical rotor core 3 is coaxially arranged at the inner periphery of the stator core 1. A large number of grooves are provided at the outer periphery of this rotor core 3, and rotor bars 4 are embedded in these grooves; both ends thereof project at both sides of the rotor core 3. Also, a plurality of ventilation passages 3a passing through in the axial direction are provided in the rotor core 3 at locations further inwards than the rotor bars 4.

Core holders 5 having ventilation passages 5a are mounted on both sides of the stator core 1. In between these, there are provided a plurality of connecting plates 6, arranged so as to be present at part of the entire periphery of the stator core 1; at the outer periphery of the stator core 1, there are formed a large number of ventilation passages 1a linked with the ventilation passages 5a.

A first bearing 10, attached by means of a first bracket 8 and bearing bracket 9, is provided at one end of the stator core 1. One end of the first bracket 8 is mounted on the core holder 5 while its other end is mounted on the bearing bracket 9; a ventilation passage 8a linked with the ventilation passage 5a is provided in the interior of this first bracket 8. A plurality of apertures 9a are provided in circular fashion in the bearing bracket 9.

The second bearing 13, attached by means of a second bracket 11 and housing 12, is provided at the other end of the stator core 1. A ventilation passage 11a is provided at the outer periphery of the second bracket 11; this ventilation passage 11a is linked with the ventilation passage 1a at the outer periphery of the stator core 1. Also, a plurality of apertures 11b are provided at the end of the second bracket 11 on the inner circumferential side thereof.

The rotor core 3 is mounted on a rotor shaft 14, the rotor shaft 14 being freely rotatably supported by means of the first and second bearings 10, 13. Core holders 15 are mounted on the rotor shaft 14 on both sides of the rotor core 3, ventilation passages 15a linked with the ventilation passage 3a of the rotor core 3 being provided in these core holders 15.

A ventilation fan 16 is fitted at a location on the rotor shaft 14 between the first bearing 10 and one of the core holders 15 and a ventilation passage 16a communicating with the ventilation passage 15a of the core holder 15 is provided in this ventilation fan 16. Also, radial vanes 16b are provided in the outer surface in the ventilation fan 16 on the side of the first bracket 8.

A ventilation passage 17 is formed by the ventilation fan 16 and bearing bracket 9, and this ventilation passage 17 communicates with the ventilation passage 8a of the first bracket 8 and the ventilation passage 16a of the ventilation fan 16. The location of the front end of the ventilation fan 16 and the location of the first bracket 8 facing this are assembled with the presence of a minute gap (first minute gap) 18 of so-called labyrinthine form, so that the cooling air current passing through the ventilation passage 17 cannot flow into the interior of the motor.

Also, a partition (sometimes called partition member) 19 is fitted at a location on the rotor shaft 14 between the second bearing 13 and the core holders 15 on the other side; this partition 19 is provided with a ventilation passage 19a communicating with the ventilation passage 15a of the core holder 15.

A ventilation passage 20 is formed by the partition 19 and second bracket 11 and housing 12; this ventilation passage 20 is linked with the ventilation passage 19a of the partition 19. The locations of the front end of the partition 19 and the second bracket 11 facing this are assembled with the presence of a minute gap (second minute gap) 21 of so-called labyrinthine shape, so that the cooling air current passing through the ventilation passage 20 cannot flow into the interior of the motor.

When this motor is driven, the ventilation fan 16 is rotated, and, by the delivery action of the vanes 16b, cold external air flows in as indicated by the arrow from the region of the aperture 9a of the bearing bracket 9; this external air flows sequentially through the ventilation passage 8a, ventilation passage 5a, ventilation passage 1a, ventilation passage 5a, and ventilation passage 11a and is thence discharged to the outside. In this way, heat generated by the stator coil 2 is discharged to the outside from the inner peripheral face of the ventilation passage 1a through the stator core 1 and cooling of the stator coil 2 is thereby promoted.

Figure 4:
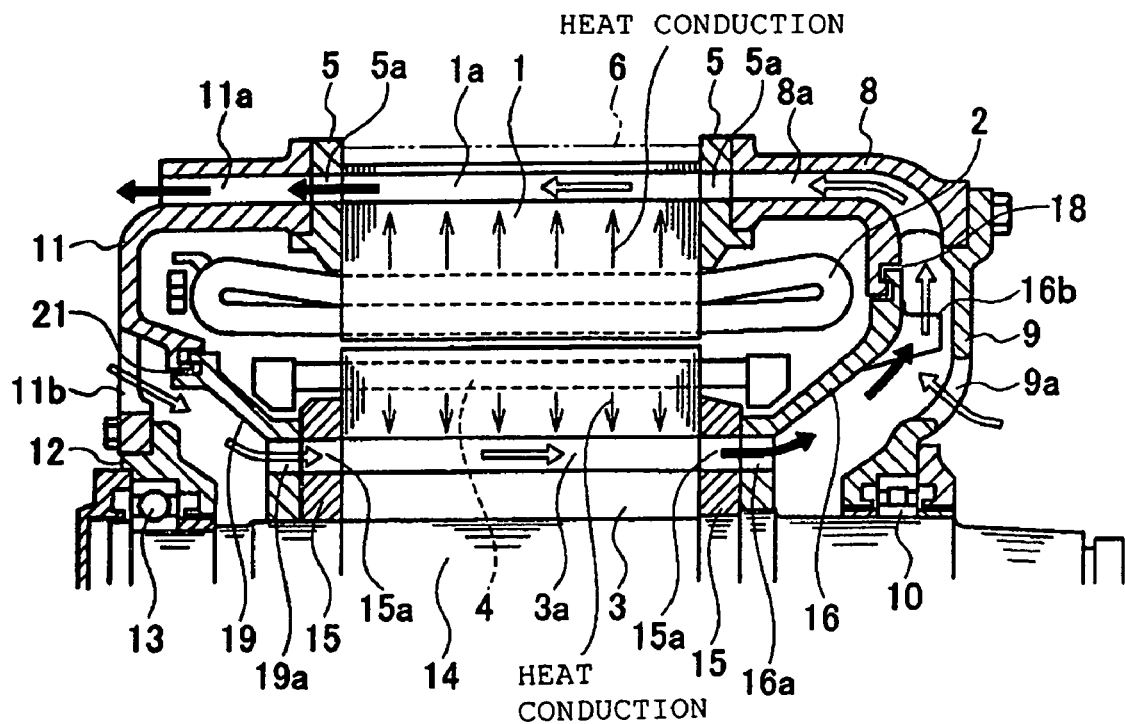
FIG. 4 is a diagram of the action of the first embodiment.

Furthermore, by the rotation of the ventilation fan 16, cold external air flows in from the region of the aperture 11b of the second bracket 11, and this external air flows sequentially through the ventilation passage 20, ventilation passage 19a, ventilation passage 15a, ventilation passage 3a, ventilation passage 15a, ventilation passage 16a, ventilation passage 17, ventilation passage 8a, ventilation passage 5a, ventilation passage 1a, ventilation passage 5a, and ventilation passage 11a and is thence discharged to the outside. In this way, heat generated by the rotor bars 4 is discharged to the outside from the ventilation passage 3a through the rotor core 3 and cooling of the rotor bars 4 is thereby promoted. Rise in temperature of the grease of the bearings 10, 13 is also suppressed thanks to the cooling by the cold cooling air current constituted by external air immediately after the inflow thereof from the apertures 9a, 11b (how the cooling air current flows and how the motor is cooled are indicated by the thick arrows in FIG. 4. The white arrows indicate the cold cooling air current and the black arrows indicate the cooling air current that has been raised in temperature).

Thanks to this construction, in addition to cooling of the heat-generating body constituted by the stator coil 2, cooling of the rotor bars 4 can also be positively performed. Also, cooling around the bearings 10, 13 can concurrently be achieved and temperature rise of the bearing grease thus suppressed: the bearing lubrication life can therefore be greatly extended. In addition, since inflow of external air to the interior of the motor is blocked by the minute gaps 18, 21, contamination of the interior of the motor cannot occur. Consequently, a fully-enclosed construction is maintained and labor-saving in maintenance can be achieved and, in addition, efficient cooling becomes possible, thereby making it possible to achieve reduction in size and increased output.

Figure 5:
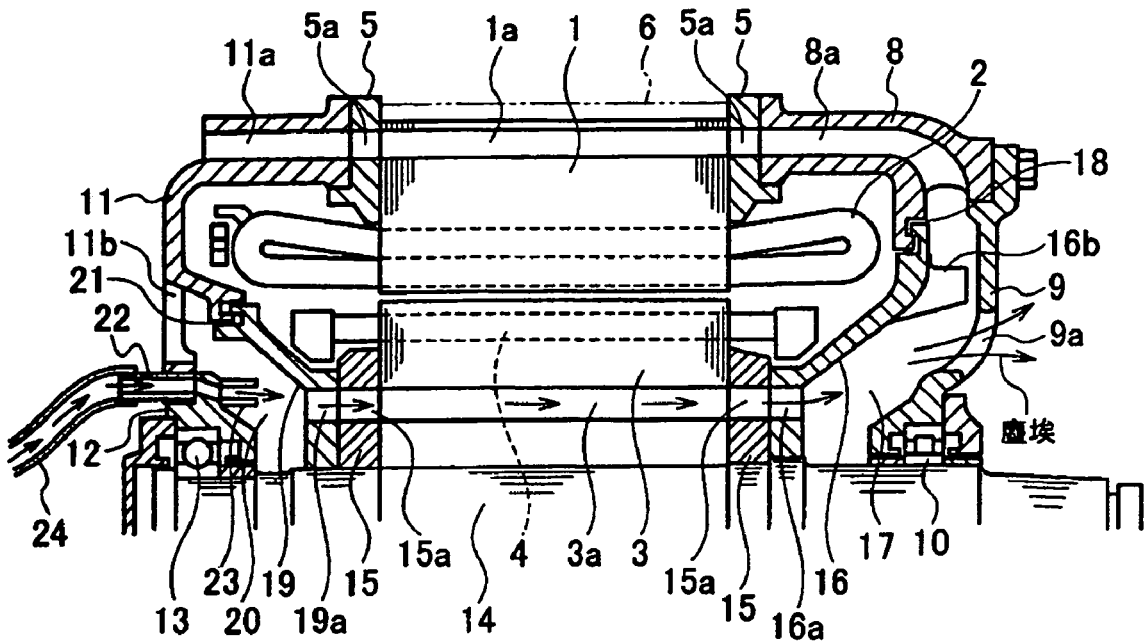
FIG. 5 is a cross-sectional view in the axial direction of a second embodiment of the present invention.

Next, a second embodiment of the present invention will be described. FIG. 5 is a cross-sectional view in the axial direction of the second embodiment. It should be noted that in the following embodiments, items which are the same or similar to those of the first embodiment are given the same reference symbols and repeated description is dispensed with.

In this embodiment, there are provided blast pipes 22, 23 to blow away dust by blasting compressed air supplied from outside onto the region of the ventilation passage 3a of the rotor core 3. The blast pipe 22 is mounted at the end on the inner peripheral side of the second bracket 11 so as to project towards the outside. The blast pipe 23 is mounted at the end on the outer peripheral side of the housing 12 so as to project inwards; these two blast pipes 22, 23 are mutually linked.

When dust is deposited on the inner surface of the ventilation passage 3a, cleaning can be effected without dismantling the motor by discharging compressed air towards the interior of the motor from the blast pipes 22, 23 that communicate with the outside of the motor. Specifically, a hose 24 is connected with the blast pipe 22 and compressed air is supplied from a compressor (not shown) to this hose 24. The construction is such that the dust that is thereby blown away is easily discharged to the outside by the aperture 9a formed in the bearing bracket 9 acting as a discharge port.

Third Embodiment

Figure 6:
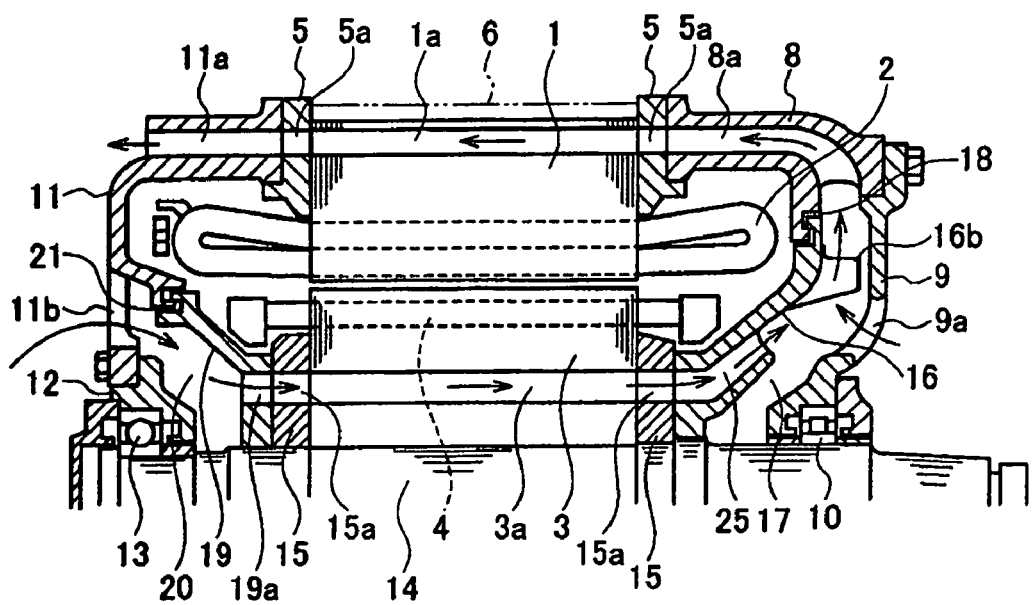
FIG. 6 is a cross-sectional view in the axial direction of a third embodiment of the present invention.

Next, a third embodiment of the present invention is described. FIG. 6 is an axial cross-sectional view of a third embodiment.

In this embodiment, in order that dust should not accumulate in the ventilation passage 3a, a ventilation fan 25 dedicated to the rotor core that sucks out air in the ventilation passage 3a is formed above the ventilation fan 16. Since the ventilation passage 38 is formed in the rotor core, which is rotating, if the centrifugal force produced by the rotation of the ventilation passage 3a becomes larger than the suction force produced by the negative pressure of the ventilation fan 16, dust may be deposited and can easily accumulate in the region outside the outer periphery of the inner surface of the ventilation passage 3a. The suction pressure must be increased in order to reduce such accumulation of dust.

Although the suction negative pressure can be increased by making the diameter of the ventilation fan 16 larger, practically all of the air current produced by this suction enters from the aperture 9a which is provided in the bearing bracket 9, so the amount of suction from the ventilation passage 3a is small. In this embodiment, in addition to the ventilation fan 16, the suction negative pressure is increased by adding a ventilation fan 25 dedicated to the rotor core; since this ventilation fan 25 dedicated to the rotor core is dedicated to the ventilation passage 3a, the effectiveness of ejection of dust is further increased. It should be noted that, in addition to this ventilation fan 25 dedicated to the rotor core, the suction pressure in respect of the ventilation passage 3a could also be raised by providing vanes of the ventilation fan 16 in a location on the side of the rotor core 3.

Fourth Embodiment

Figure 7:
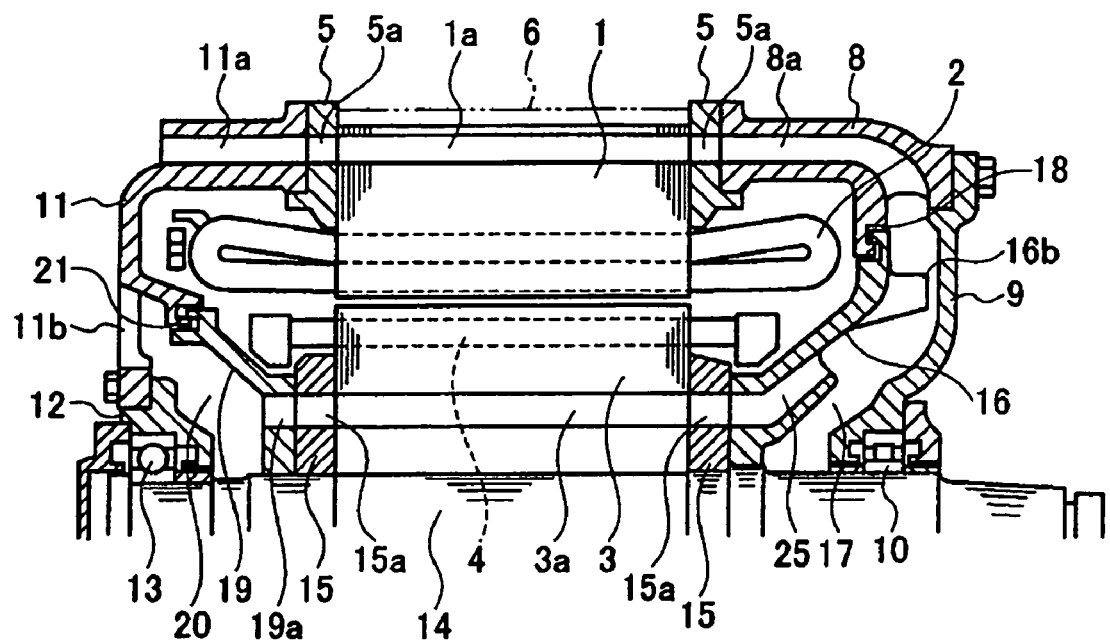
FIG. 7 is a cross-sectional view in the axial direction of a fourth embodiment of the present invention.

Next, a fourth embodiment of the present invention will be described. FIG. 7 is an axial cross-sectional view of the fourth embodiment.

In this embodiment, the aperture 9a of the bearing bracket 9 is eliminated from the construction of the third embodiment, so intake of external air only takes place from the aperture 11b of the second bracket 11. In this case, compared with the third embodiment, the cooling properties regarding the rotor core 3 are inferior, but manufacture is facilitated since no aperture 9a is provided in the bearing bracket 9: the advantage is therefore obtained that manufacturing costs can be reduced.

Fifth Embodiment

Figure 8:
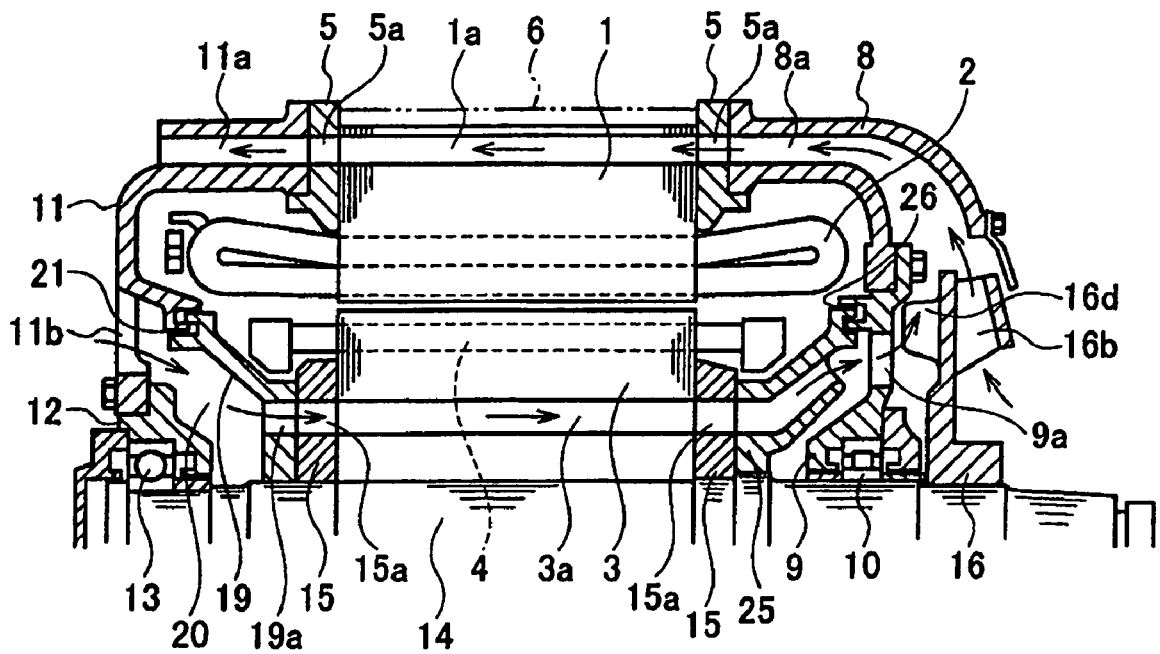
FIG. 8 is a cross-sectional view in the axial direction of a fifth embodiment of the present invention.
Figure 9:
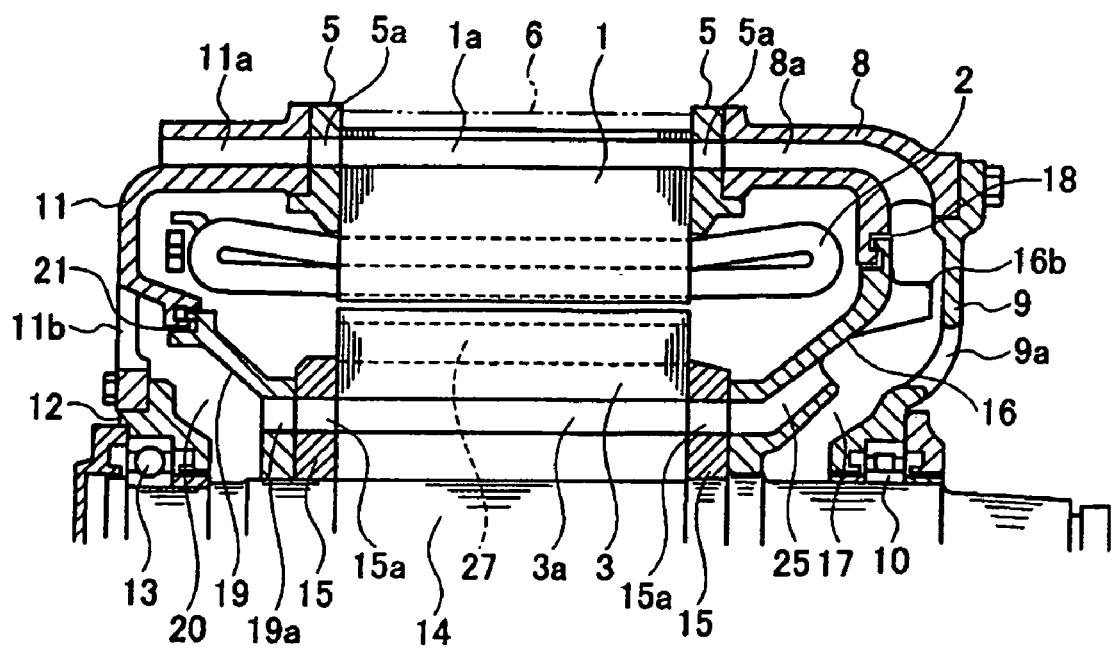
FIG. 9 is a cross-sectional view in the axial direction of a sixth embodiment of the present invention.

Next, a fifth embodiment of the present invention will be described. FIG. 8 is an axial cross-sectional view of the fifth embodiment.

In this embodiment, the construction is such that the position of the ventilation fan 16 and of the bearing bracket 9 of the third embodiment are interchanged. The ventilation fan 16 is fixed to the rotor shaft 14 in a position on the outside of the motor with respect to the bearing bracket 9 and vanes 16b, 16d are formed on both the inside and outside faces at the front end thereof.

The ventilation fan 25 dedicated to the rotor core is a separate unit from the ventilation fan 16 and is fixed on the rotor shaft 14 at a position between the bearing bracket 9 and the core holder 15. The current of cooling air in the ventilation passage 3a is sucked in by the ventilation fan 25 dedicated to the rotor core and is delivered to the ventilation fan 16 through an aperture 9a provided in the bearing bracket 9. The ventilation fan 16 then delivers this current of cooling air to the stator core 1 by means of the vanes 16d and delivers external air to the stator core 1 by means of the vanes 16b.

The locations of the front end of the ventilation fan 25 dedicated to the rotor core and the bearing bracket 9 facing this in the assembly are such that a so-called labyrinthine minute gap 26 is present therebetween, so that air trying to flow into the aperture 9a of the bearing bracket 9 cannot flow into the interior of the motor. This minute gap 26 could be formed between the ventilation fan 25 dedicated to the rotor core and the first bracket 8.

With such a construction, the cooling performance of the stator core 1 is improved, since a current of cooling air can be positively supplied to the stator core 1. Also, since the current of cooling air passing through the ventilation passage 3a of the rotor core 3 is subjected to suction by two ventilation fans 16, 25, a high rate of passage of cooling air through the ventilation passage 3a can be achieved, making it possible to improve the cooling performance of the rotor core 3. In addition, use of the cooling fan 16 makes it possible to prevent penetration of water from the aperture 9a into the interior when dust deposited on the outside of the motor is washed off using water: lowering of the performance of the grease of the bearings 10 can thereby be prevented.

Sixth Embodiment

Next, a sixth embodiment of the present invention is described. FIG. 8 is an axial cross-sectional view of the sixth embodiment.

This embodiment shows an example in which a permanent magnet motor is employed, in which a permanent magnet is employed for the rotor. In the permanent magnet motor, instead of rotor bars, a permanent magnet 27 is provided for the rotor core 3. It should be noted that although, in this embodiment, an example is described in which the present invention is applied to an inductive motor (induction motor), the present invention could also be applied to a synchronous motor not using a magnet.

Seventh Embodiment

Figure 10:
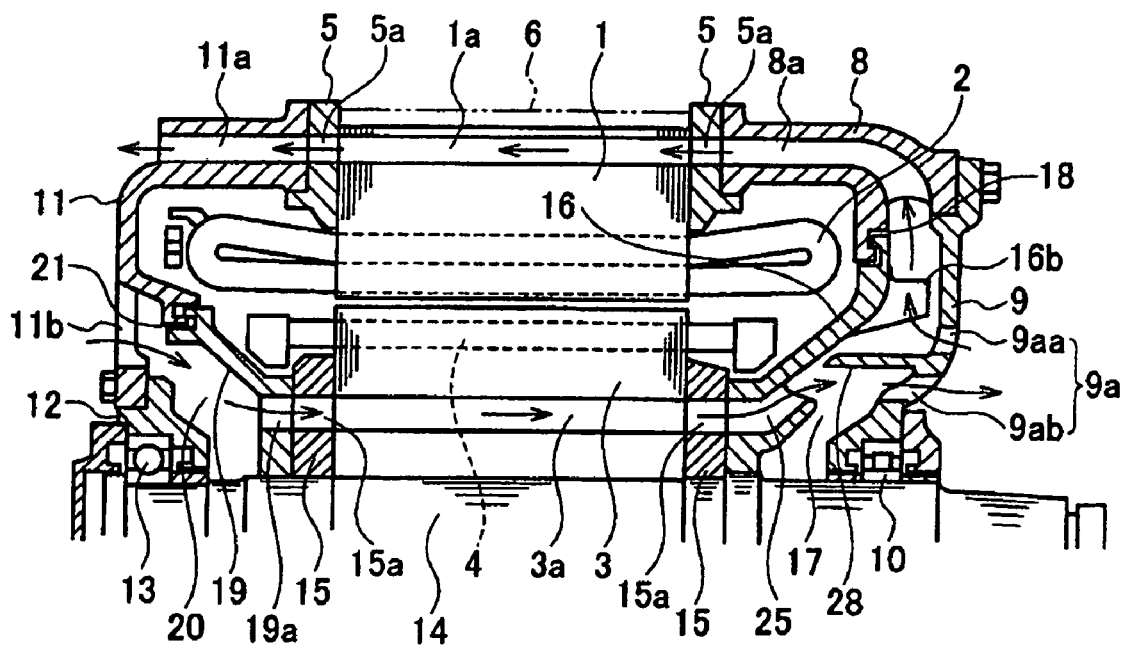
FIG. 10 is a cross-sectional view in the axial direction of a seventh embodiment of the present invention.

Next, a seventh embodiment of the present invention is described. FIG. 10 is an axial cross-sectional view of the seventh embodiment.

In this embodiment, the aperture 9a of the bearing bracket 9 is partitioned by a partition 28 into a divided aperture 9aa on the outer peripheral side and a divided aperture 9ab on the inner peripheral side. In this way, external air entering from the aperture 11b can be discharged from the divided aperture 9ab by means of the ventilation fan 25 dedicated to the rotor core. Furthermore, external air entering from the divided aperture 9aa is discharged to the outside from the ventilation passage 11a through the ventilation passage 18a and ventilation passages 1a.

Since, in this embodiment, the current of cooling air heated by the rotor core unit 3 does not flow to the stator core 1, the advantage is obtained that the cooling performance of the stator core is improved.

Eighth Embodiment

Figure 11:
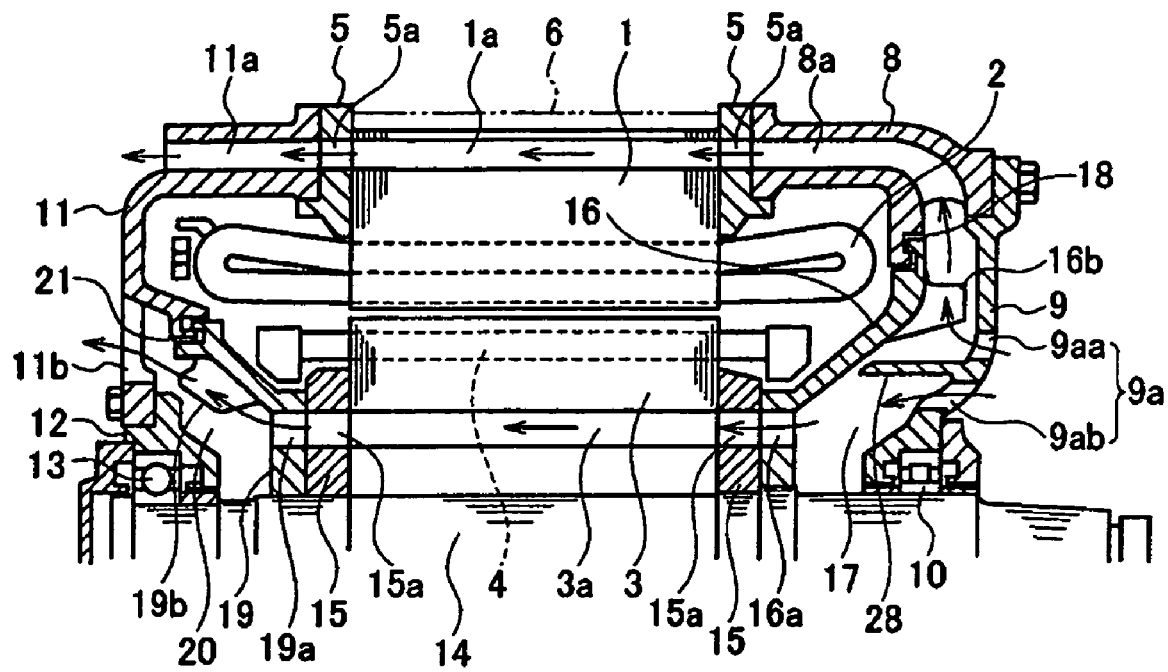
FIG. 11 is a cross-sectional view in the axial direction of an eighth embodiment of the present invention.

Next, an eighth embodiment of the present invention is described. FIG. 11 is an axial cross-sectional view of the eighth embodiment.

This embodiment is a modified example of the seventh embodiment and it differs from the seventh embodiment in that vanes 19b are provided on the partition 19 instead of a ventilation fan 25 dedicated to the rotor core being provided on the ventilation fan 16. With this construction, a ventilation path of the same configuration can be provided at the stator side, but the divided aperture 9ab at the rotor side constitutes an inlet while the aperture 11b constitutes a discharge port. That is to say, the external air flowing in from the divided aperture 9ab flows through the ventilation passage 3a of the rotor core 3 from the side of the first bearing 10 towards the second bearing 13 and is discharged to the outside from the aperture 11b of the second bracket 11. In this way, the advantage of improved cooling performance of the stator is obtained, since it becomes more difficult for the current of cooling air flowing to the stator to be heated by the current of cooling air on the rotor side.

In the above embodiments, the case was described in which a labyrinthine minute gap was provided in the region of the division between the interior and exterior of the motor, but a construction could be adopted in which a sealing member made of felt or the like is inserted in this minute gap and sliding of this sealing member takes place with rotation of the ventilation fan and/or partition member. In this way, penetration of air from outside the motor to its interior can be reliably prevented.

Ninth Embodiment

Figure 12:
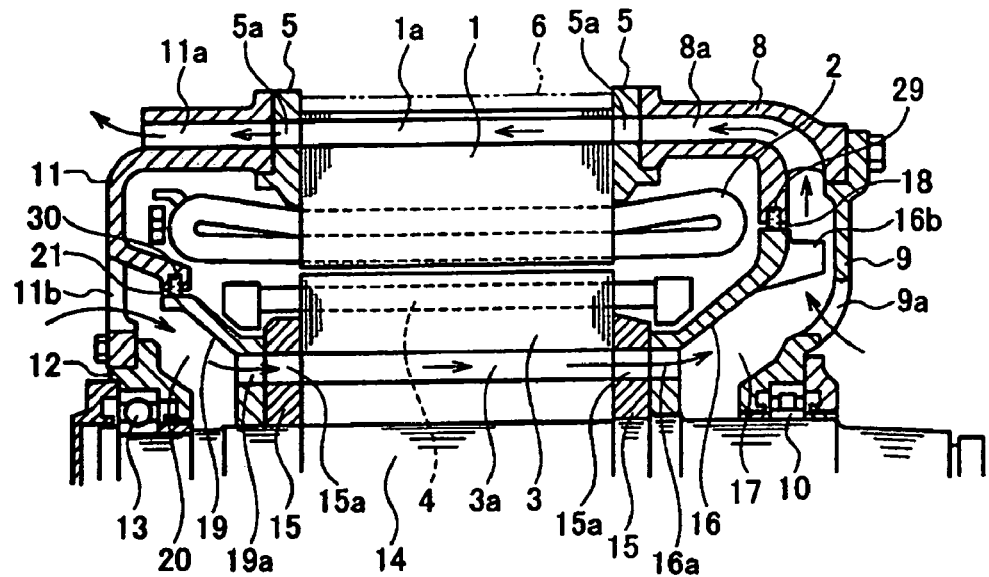
FIG. 12 is a cross-sectional view in the axial direction of a ninth embodiment of the present invention.
Figure 13:
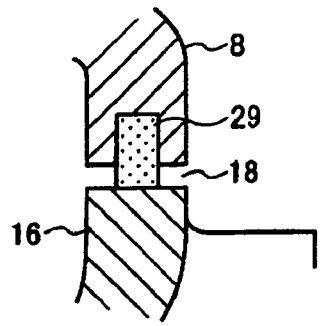
FIG. 13 is a detail view of FIG. 10.

Also, the minute gap need not be bent but could of a simple abutment construction. FIG. 12 is an axial cross-sectional view of a ninth embodiment, in which a sealing member is provided in such a minute gap and FIG. 13 is a detail view thereof. The sealing members 29, 30, made of felt or the like, provided in the minute gaps 18, 21 are mounted on the first and second brackets 8 and 11 and slide with respect to the rotating ventilation fan 16 and partition 19.

Figure 14:
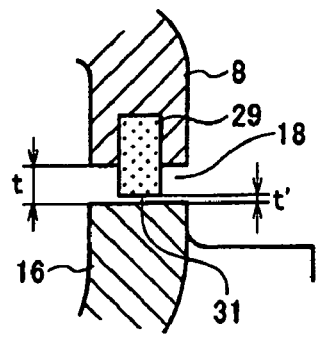
FIG. 14 is a detail view of a modified example of the ninth embodiment.

Also, as shown in FIG. 14, a gap 31 of smaller width t' than the width t of the minute gap 18 (21) between the sealing member 29 (30) and the ventilation fan 16 (partition 19) may be provided. In this case, whereas the width t of the gap 18 (21) formed for example in labyrinthine shape needs to be about 0.5 mm, the width t' of this gap 31 can be made 0.1 mm or less, so penetration of air into the interior of the motor can be reliably prevented.

Tenth Embodiment

Figure 15:
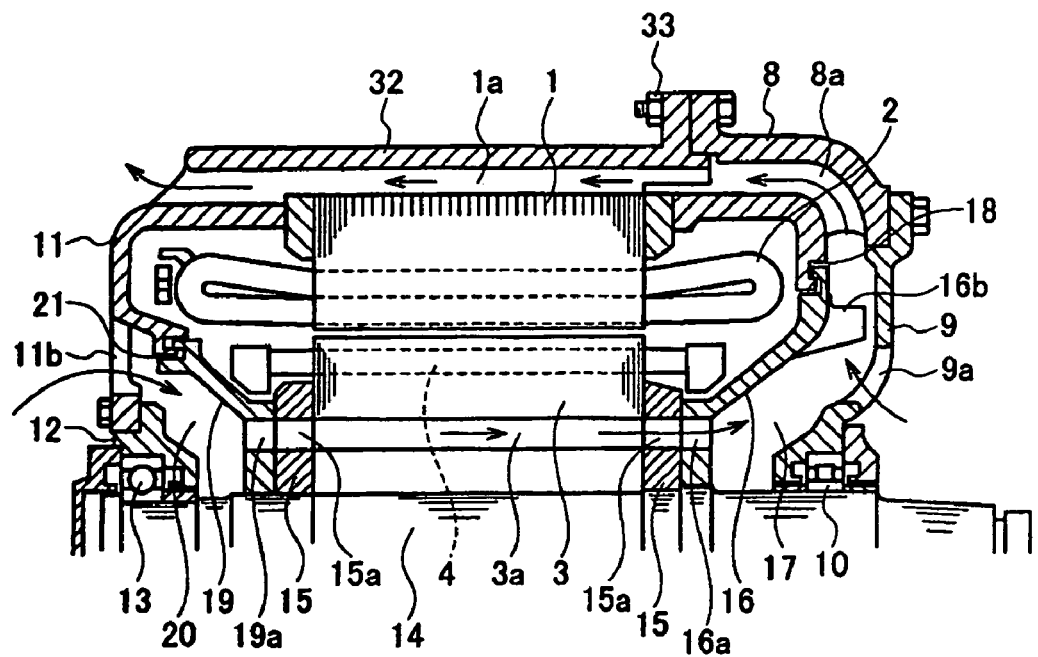
FIG. 15 is a cross-sectional view in the axial direction of a tenth embodiment of the present invention.

Also, although, in the above embodiments, the case was described of a frameless construction of the stator, in which the stator core was supported by fastening the core holder with a fastening plate, a construction could be adopted having a tubular frame that supports the stator core on the outside of the stator core. FIG. 15 is an axial cross-sectional view of the tenth embodiment comprising such a frame; outside the stator core 1, a tubular frame 31 that supports the stator core 1 is mounted on a first bracket 8 by means of a securing member 33.

Also, the ventilation fan and partition member may be integrally constructed with a core holder that holds the rotor core from both sides. In this specification, a construction is shown in which these are separate, and a detailed description thereof is dispensed with.

Eleventh Embodiment

Also, fins may be constructed by providing concave/convex structures on the surface separately from the ventilation fan dedicated to the rotor core and/or separately from the vanes that generate the air current on the ventilation fan. The cooling effect is further increased, since these fins have the effect of radiating the heat that is transmitted to the fan and/or partition member.

Figure 16:
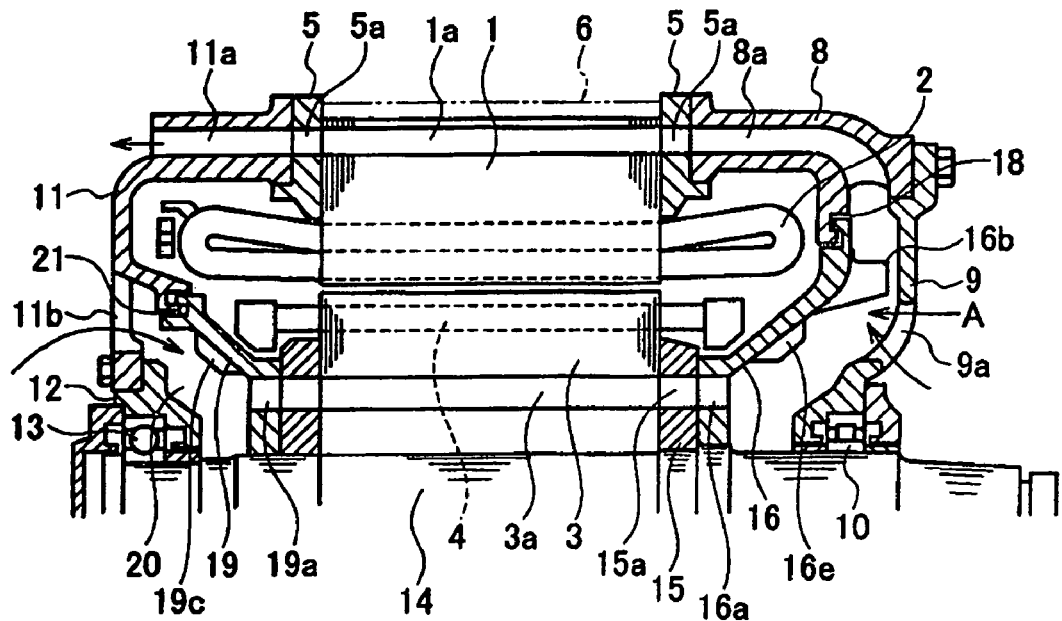
FIG. 16 is a cross-sectional view in the axial direction of an eleventh embodiment of the present invention.
Figure 17:
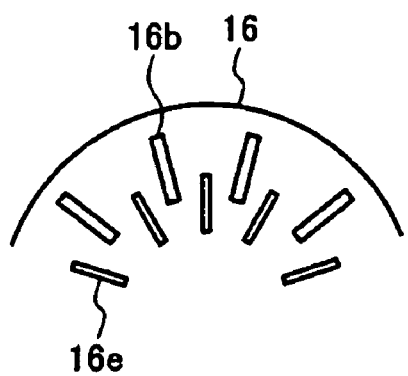
FIG. 17 is a view in the direction of the arrow A of FIG. 14.

FIG. 16 is an axial cross-sectional view of an eleventh embodiment, in which such fins are provided; FIG. 17 is a view seen in the direction of the arrow A in FIG. 16. In this example, heat radiating fins 16e, 19c are provided in radial fashion, at a location further inwards than the vanes 16b that generate the current of air in the ventilation fan 16, and on the partition 19.

Twelfth Embodiment

Figure 18:
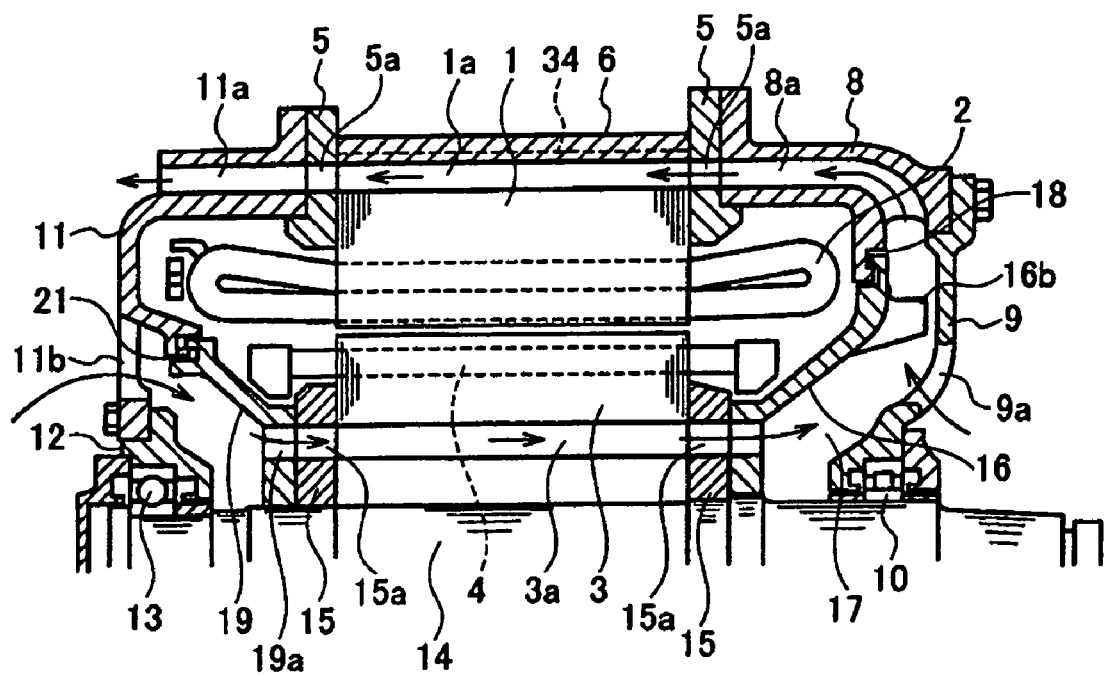
FIG. 18 is a cross-sectional view in the axial direction of a twelfth embodiment of the present invention.
Figure 19:
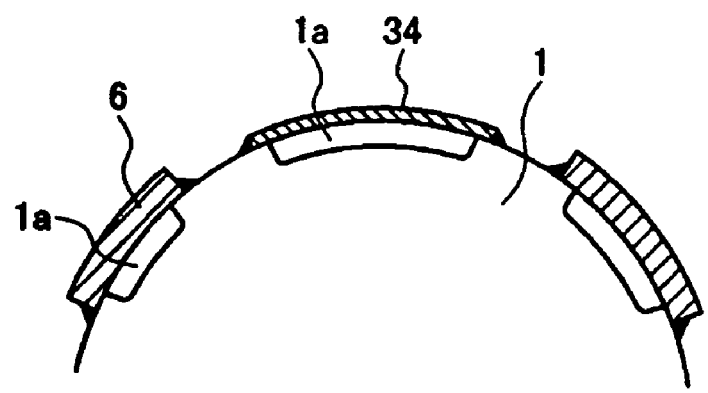
FIG. 19 is a detail cross-sectional view of FIG. 16.

Also, regarding the ventilation construction at the outer peripheral side of the stator core, the outside of the stator core may be covered with a cover and the ventilation passages may be formed between this cover and the outer periphery of the stator core instead of in holes provided in the stator core. FIG. 18 is an axial cross-sectional view of a twelfth embodiment in which such a cover is provided and FIG. 19 is a detail cross-sectional view thereof. Ventilation passages 1a are formed between the cover 34 that is mounted at the outside of the stator core 1 and the fastening plate 6 and stator core 1.

MODIFIED EXAMPLE

Figure 20:
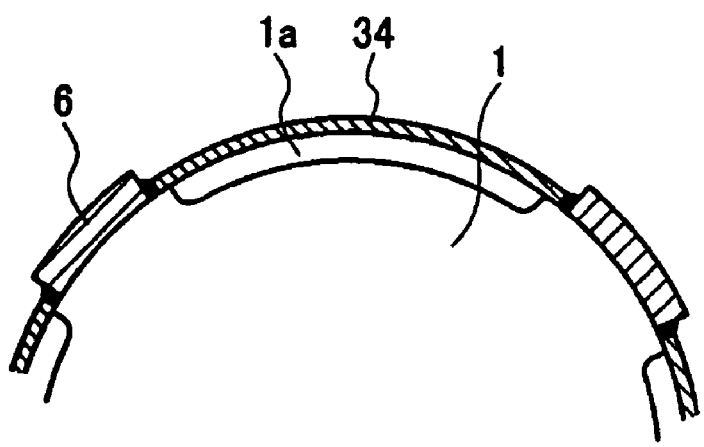
FIG. 20 is a detail view of a modified example of the twelfth embodiment.

FIG. 20 shows another example, in which a fastening plate 6 is tightly attached at the outer periphery of the stator core 1 and ventilation passages 1a are formed only between the cover 34 and the stator core 1.

Also, although, in the above embodiments, the case was described in which the first bracket and the bearing bracket were constituted by separate members, it would be possible for these to be integrally formed.

In addition, rather than employing the embodiments described above in this specification respectively independently, a construction could be adopted suitably combining a plurality of embodiments.

What is claimed is:

1. A fully-enclosed fan-cooled motor comprising:
   a stator core for a motor;
   a rotor core arranged at an inner periphery of said stator core, provided with a ventilation passage passing therethrough in an axial direction;
   a first bearing provided by means of a first bracket having a ventilation passage and a bearing bracket at one end of said stator core;
   a second bearing provided by means of a second bracket and housing at another end of said stator core;
   a rotor shaft on which said rotor core is mounted, freely rotatably supported by said first and second bearings;
   a ventilation passage linked with a ventilation passage of said first bracket, formed at an outer periphery of said stator core;
   a ventilation fan with vanes arranged on an outer surface thereof, mounted in a location on said rotor shaft between said first bearing and said rotor core;
   a partition member mounted on said rotor shaft between said second bearing and said rotor core;
   a first minute gap that blocks inflow of air into said motor between a front end of said ventilation fan and said first bracket;
   a second minute gap that blocks inflow of air into said motor between said front end of said partition member and said second bracket;
   an first aperture provided in a location at an inner periphery further inward than said vanes on said bearing bracket,
   wherein a current of cooling air is formed by introduction of external air by said ventilation fan from first aperture, said current of cooling air is again discharged to an outside through said ventilation passage of said first bracket and said ventilation passage on said outer peripheral side of said stator core; and
   a second aperture provided in said second bracket,
   wherein a current of cooling air is formed by introduction of external air by said ventilation fan from said second aperture, and said current of cooling air is again discharged to an outside through said ventilation passage of said rotor core, said ventilation passage of said first bracket and said ventilation passage on said outer peripheral side of said stator core.

2. A fully-enclosed fan-cooled motor comprising:
   a stator core for a motor;

a rotor core arranged at an inner periphery of said stator core, provided with a ventilation passage passing therethrough in an axial direction;

a first bearing provided by means of a first bracket having a ventilation passage and a bearing bracket at one end of said stator core;

a second bearing provided by means of a second bracket and housing at another end of said stator core;

a rotor shaft on which said rotor core is mounted, freely rotatably supported by said first and second bearings;

a ventilation passage linked with a ventilation passage of said first bracket, formed at an outer periphery of said stator core;

a ventilation fan with vanes arranged on an outer surface thereof, mounted in a location on said rotor shaft between said first bearing and said rotor core;

a partition member mounted on said rotor shaft between said second bearing and said rotor core;

a first minute gap that blocks inflow of air into said motor between a front end of said ventilation fan and said first bracket;

a second minute gap that blocks inflow of air into said motor between a front end of said partition member and said second bracket; and an aperture provided in said second bracket, wherein a current of cooling air is formed by introduction of external air by said ventilation fan from said aperture, and said current of cooling air is again discharged to said outside through said ventilation passage of said rotor core, said ventilation passage of said first bracket and said ventilation passage on said outer peripheral side of said stator core.

3. A fully-enclosed fan-cooled motor comprising:

a stator core for a motor;

a rotor core arranged at an inner periphery of said stator core, provided with a ventilation passage passing therethrough in an axial direction;

a first bearing provided by means of a first bracket having a ventilation passage and a bearing bracket at one end of said stator core;

a second bearing provided by means of a second bracket and housing at another end of said stator core;

a rotor shaft on which said rotor core is mounted, freely rotatably supported by said first and second bearings;

a ventilation passage linked with a ventilation passage of said first bracket, formed at an outer periphery of said stator core;

a first ventilation fan with vanes arranged on inner and outer surfaces thereof, mounted in a location on said rotor shaft further towards an outside of said motor than said first bearing;

a second ventilation fan dedicated to said rotor core, that sucks out an air in said rotor core ventilation passage on a side of said first bearing, mounted at a location on said rotor shaft between said rotor core and said first bearing;

a partition member mounted on said rotor shaft between said second bearing and said rotor core;

a first minute gap that blocks inflow of air into said motor between a front end of said ventilation fan dedicated to said rotor core and said bearing bracket or said first bracket;

a second minute gap that blocks inflow of air into said motor between a front end of said partition member and said second bracket;

a first aperture provided in a location at an inner periphery on said bearing bracket further inward than vanes on an internal face of said ventilation fan, wherein a current of cooling air is formed by introduction of external air by said ventilation fan, said current of cooling air is again discharged to an outside through said ventilation passage of said first bracket and said ventilation passage on said outer peripheral side of said stator core; and a second aperture provided in said second bracket, wherein a current of cooling air is formed by introduction of external air by said ventilation fan dedicated to said rotor core and by said ventilation fan from said second aperture, and said current of cooling air is again discharged to an outside through said ventilation passage of said rotor core, said second aperture of said bearing bracket, said ventilation passage of said first bracket and said ventilation passage on said outer peripheral side of said stator core.

4. The fully-enclosed fan-cooled motor according to any of claims 1 to 3, further comprising a blast pipe provided whereby external compressed air can be blasted into a ventilation passage of said rotor core from said second bearing.

5. The fully-enclosed fan-cooled motor according to claim 1 or 2, further comprising a ventilation fan dedicated to said rotor core, that sucks out air in said ventilation passage of said rotor core towards said first bearing.

6. The fully-enclosed fan-cooled motor according to claim 5, wherein said ventilation fan dedicated to said rotor core is integrally formed with said ventilation fan.

7. The fully-enclosed fan-cooled motor according to claim 5, wherein said aperture provided in said bearing bracket is partitioned into two divided apertures at said outer periphery and inner periphery, said divided aperture at said outer periphery serves as an inlet for external air passing through said ventilation passage at said outer peripheral side of said stator core and said divided aperture at said inner periphery serves as a discharge port for external air that has passed through said ventilation passage of said rotor core.

8. The fully-enclosed fan-cooled motor according to claim 6, wherein said aperture provided in said bearing bracket is partitioned into two divided apertures at said outer periphery and inner periphery, said divided aperture at said outer periphery serves as an inlet for external air passing through said ventilation passage at said outer peripheral side of said stator core and said divided aperture at said inner periphery serves as a discharge port for external air that has passed through said ventilation passage of said rotor core.

9. The fully-enclosed fan-cooled motor according to claim 6, wherein said aperture provided in said bearing bracket is partitioned into two divided apertures at said outer periphery and inner periphery and said partition member is provided with vanes, said divided aperture at said outer periphery serves as an inlet for external air passing through said ventilation passage of said stator core and said divided aperture at said inner periphery serves as an inlet for external air passing through said ventilation passage of said rotor core, and said external air is discharged to said outside from said aperture of said second bracket by flowing from said first bearing towards said second bearing through said ventilation passage of said rotor core.

10. The fully-enclosed fan-cooled motor according to claim 5, further comprising
vanes for sucking out external air through said ventilation passage of said rotor core, provided on said ventilation fan.

11. The fully-enclosed fan-cooled motor according to claim 6, further comprising
vanes for sucking out external air through said ventilation passage of said rotor core, provided on said ventilation fan.

12. The fully-enclosed fan-cooled motor according to any of claims 1 to 3,
wherein said motor is a permanent magnet motor, wherein a permanent magnet is mounted as said rotor core.

13. The fully-enclosed fan-cooled motor according to any of claims 1 to 3,
wherein said motor is a synchronous motor.

14. The fully-enclosed fan-cooled motor according to any of claims 1 to 3, further comprising
a tubular frame provided outside said stator core, that supports said stator core.

15. The fully-enclosed fan-cooled motor according to any of claims 1 to 3, further comprising
a sealing material that blocks penetration of air into said first or second minute gaps.

16. The fully-enclosed fan-cooled motor according to any of claims 1 to 3, further comprising
a plurality of heat radiating fins provided on said ventilation fan dedicated to said rotor core or said ventilation fan.

17. The fully-enclosed fan-cooled motor according to any of claims 1 to 3, further comprising
a cover provided outside said stator core,
wherein a ventilation passage is formed between said cover and said outer peripheral surface of said stator core.

* * * * *